Aug. 4, 1936.　　　G. F. DRIEMEYER　　　2,049,605
SPUD STRUCTURE
Filed June 14, 1934　　　8 Sheets-Sheet 1

Inventor
GEORGE FRED DRIEMEYER
By Rodney Bedell
Attorney

Aug. 4, 1936.　　　　G. F. DRIEMEYER　　　　2,049,605
SPUD STRUCTURE
Filed June 14, 1934　　　　8 Sheets-Sheet 3

Inventor
GEORGE FRED DRIEMEYER
By Rodney Bedell
Attorney

Aug. 4, 1936. G. F. DRIEMEYER 2,049,605
SPUD STRUCTURE
Filed June 14, 1934 8 Sheets-Sheet 4

Inventor
GEORGE FRED DRIEMEYER

By Rodney Bedell
Attorney

Aug. 4, 1936.    G. F. DRIEMEYER    2,049,605
SPUD STRUCTURE
Filed June 14, 1934    8 Sheets-Sheet 7

Inventor
GEORGE FRED DRIEMEYER

By Rodney Bedell
Attorney

Patented Aug. 4, 1936

2,049,605

UNITED STATES PATENT OFFICE 2,049,605

SPUD STRUCTURE

George Fred Driemeyer, St. Louis, Mo., assignor to General Steel Castings Corporation, Granite City, Ill., a corporation of Delaware Application June 14, 1934, Serial No. 730,547

5 Claims. (Cl. 37—73)

This invention relates to spuds for supporting and anchoring dredges, derricks, drill boats, and similar vessels during operation of the digging or lifting mechanism.

Spuds utilized to support the boat hull are subjected to very substantial compressive as well as bending forces due to weight of boat, thrust of dipper, currents and cross tides. The spud usually has a tapering lower extremity which is imbedded in the bottom of the body of water. Frequently only a single spud is used as an anchor about which the boat is permitted to swing due to wind and currents. Where raising and lowering mechanism prevents rotation of the spud within its bearings in the boat hull, swinging of the vessel applies twisting forces to the spud and also tends to loosen the imbedding of the same in the bottom and, if the bottom is hard or rocky, causes wearing of the spud point.

An object of the present invention is to provide a rugged, durable spud structure which is well adapted to resist the various forces applied thereto, as referred to above, and in which the metal is disposed most economically according to stresses carried by various portions of the spud but without excessively increasing the weight thereof.

Another object is to provide means rigidly associated with the spud for applying longitudinal forces thereto during raising and lowering and while supporting the boat hull.

Another object is to eliminate twisting forces on the spud as well as wearing of the point thereof, due to swinging of the boat, by providing a separate point structure which is rotatably mounted in the body of the spud.

Another object is to provide a spud formed substantially as an integral cast unit with reinforcing structure on the interior thereof.

These objects and others are attained by the structures illustrated in the accompanying drawings in which—

In Figures 1 to 8 is illustrated a spud formed in its entirety as an integral hollow casting with outer wall 1 of cylindrical contour. Extending across the interior of the structure at intervals are the diaphragms 2 having central apertures 3 to facilitate casting and to lighten the structure and also to permit a workman to enter the interior for inspection and repair purposes. At the lower extremity is an unusually long tapering fluted portion 4 terminating in a conical point 5 for imbedding in the water bottom being dredged.

Figures 1, 2, 3, 4, 5, 6, 7, 8:
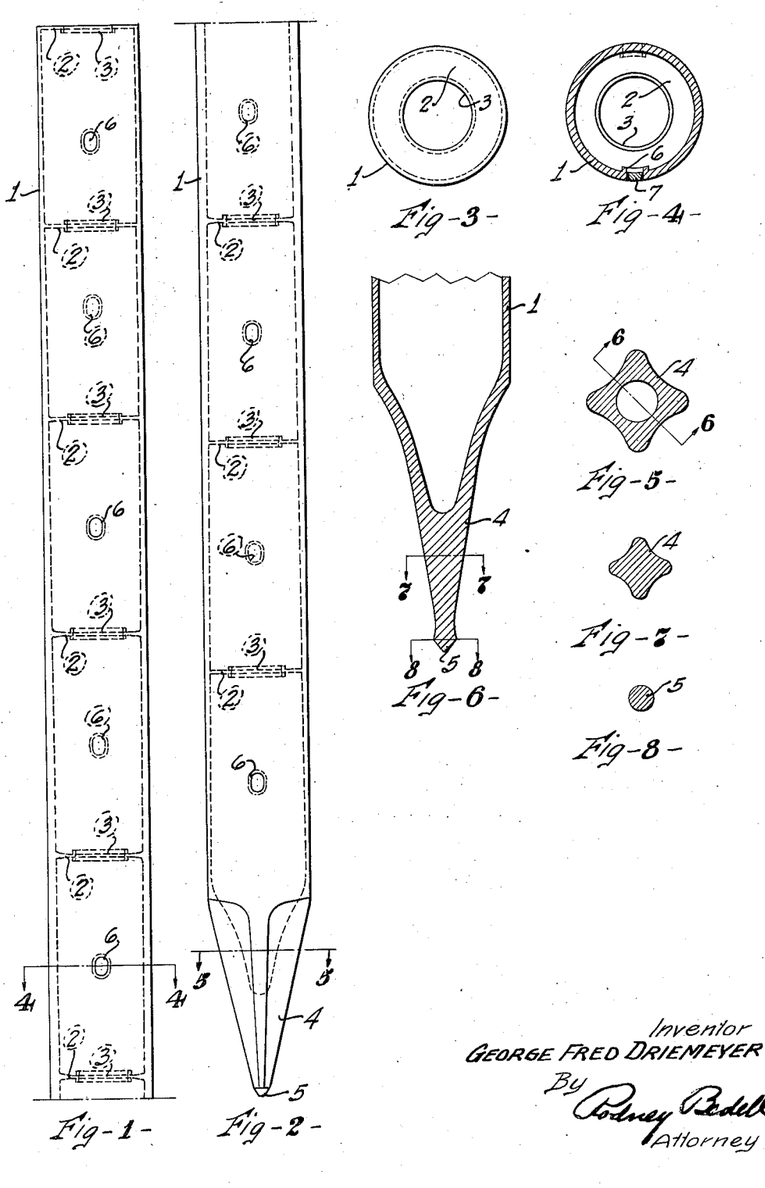
Figure 1 is a side view of the upper half of a spud embodying one form of the invention.
Figure 2 is a side view showing the lower half of the spud.
Figure 3 is a top view of the spud.
Figures 4 and 5 are horizontal sections taken on the corresponding section lines of Figures 1 and 2, respectively.
Figure 6 is a vertical section showing the lower extremity of the spud and taken on the line 6—6 of Figure 5.
Figures 7 and 8 are horizontal sections taken on the corresponding section lines of Figure 6.

The outer wall 1 gradually increases in thickness from each end of the spud towards the center, to resist bending stresses in the structure which are greatest in the intermediate portion, and decrease gradually towards the ends. Apertures 6 provided in the wall at intervals for venting gases, supporting cores, and to facilitate cleaning out the cores after casting, are closed by plates 7 welded in place whereby the spud is water-tight.

This type of spud is adapted to rotatably engage a suitable bearing in the boat hull so as to remain stationary during swinging of the hull. The spud is lowered and raised by means of a cable (not shown), or other suitable means. No means is provided for supporting the hull on the spud.

Figure 9:
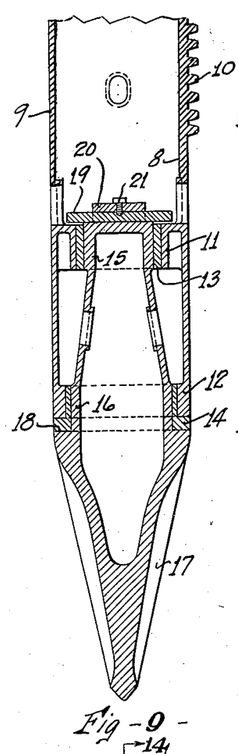
Figure 9 is a longitudinal section illustrating the lower part of a modified form of the invention and taken on the line 9—9 of Figure 10.
Figure 10:
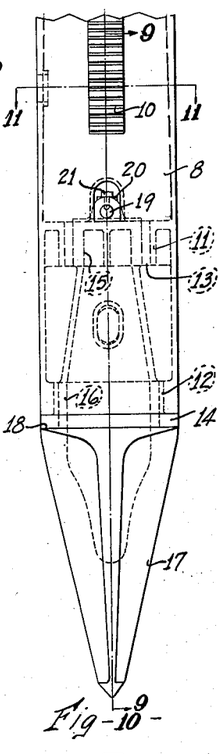
Figure 10 is a side view of the modified spud.
Figure 11:
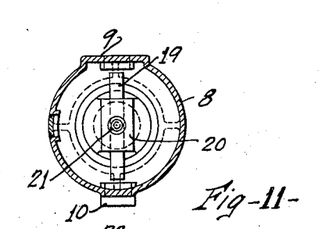
Figure 11 is a horizontal section taken on the line 11—11 of Figure 10.

In Figures 9, 10, and 11, the spud includes an approximately cylindrical body portion 8 having a flattened side 9 for slidably engaging a bearing in the boat hull to prevent rotation of the spud in the bearing, and integral teeth 10 forming a rack for cooperating with a pinion and power or hand driven mechanism in raising and lowering the spud. The metal of the body portion is gradually thickened from the ends towards the center as in the first form. At the lower end of body portion 8 are a pair of longitudinally spaced internal cylindrical bearings 11 and 12 having liners 13 and 14. Rotatably seated in bearings 11 and 12 are the complementary bearings 15 and 16 on the upper portion of the fluted tapering point member 17.

Extending around the lower point bearing 16 is a shoulder 18 abutting a downwardly facing shoulder on the liner 14. A bar 19 secured to the top of the point structure by plate 20 and screw 21, overlaps the upwardly facing shoulder formed by the bearing 11 and liner 13. Shoulder 18 and bar 19 cooperate to maintain the body and point portions securely assembled, while permitting free rotation between these parts. By means of the novel rotating point, the rack may be permanently geared to its operating mechanism and the boat may freely swing about the spud without applying twisting stresses to the spud or affecting the imbedded point thereof.

Figure 12:
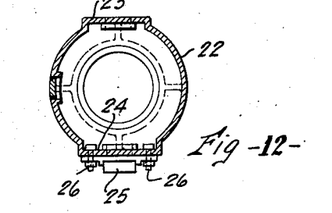
Figure 12 is a section corresponding to Figure 11 but showing another modification.

Figure 12 is a section of a spud similar to that in Figures 9 to 11. The body portion 22 in this form has flat sides 23 and 24 disposed at 180° to each other, one of which engages a hull guide and the other of which mounts a separate rack 25 by means of bolts 26.

Figures 13 to 17 show the upper portion of a spud of generally cylindrical shape but having four flat sides 27 for engaging guides in the boat hull to prevent relative rotation of the spud. Extending through the upper part of the spud is a narrow recess 28 receiving the sheave wheel 29. The axle 30 of the sheave wheel is rotatably mounted in cylindrical bearings 31 at the sides of recess 28, the assembly being maintained by plates 32 bolted over the ends of the axle. Projecting above the top wall 33 is the integral lifting lug 34.

Figure 13:
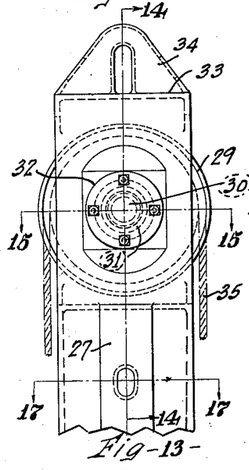
Figure 13 is a side view showing the top portion of another modification.
Figure 14:
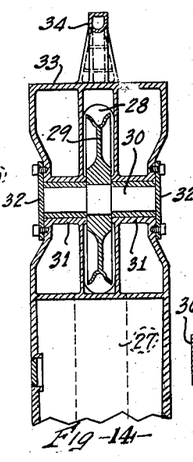
Figure 14 is a longitudinal section taken on the line 14—14 of Figure 13.
Figure 15:
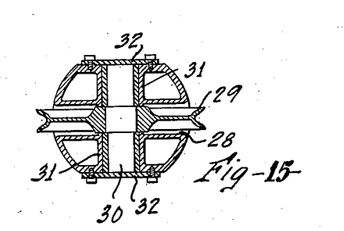
Figures 15 and 17 are horizontal sections taken on the corresponding section lines of Figure 13.
Figure 16:
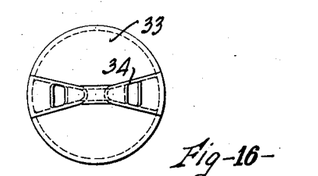
Figure 16 is a top view of the structure in Figure 13.

The spud is lowered by means of a cable 35, one end of which may be fastened to the hull and the other end wound up on a drum operated by an engine or motor. In lifting the spud, the lug 34 is engaged by a hook and cable controlled by derrick or other power controlled mechanism.

Figures 17, 18:
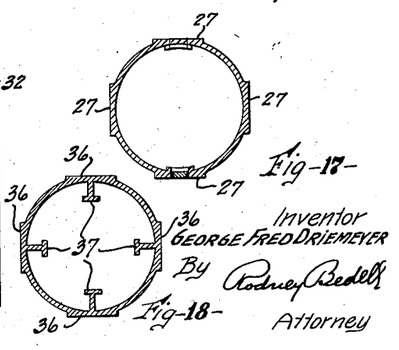
Figure 18 is a section similar to Figure 17 but showing another modification.

In Figure 18, the flat guide portions 36 of the spud wall are reinforced by longitudinal internal ribs 37.

Figures 19, 20, 21, 22, 23, 24:
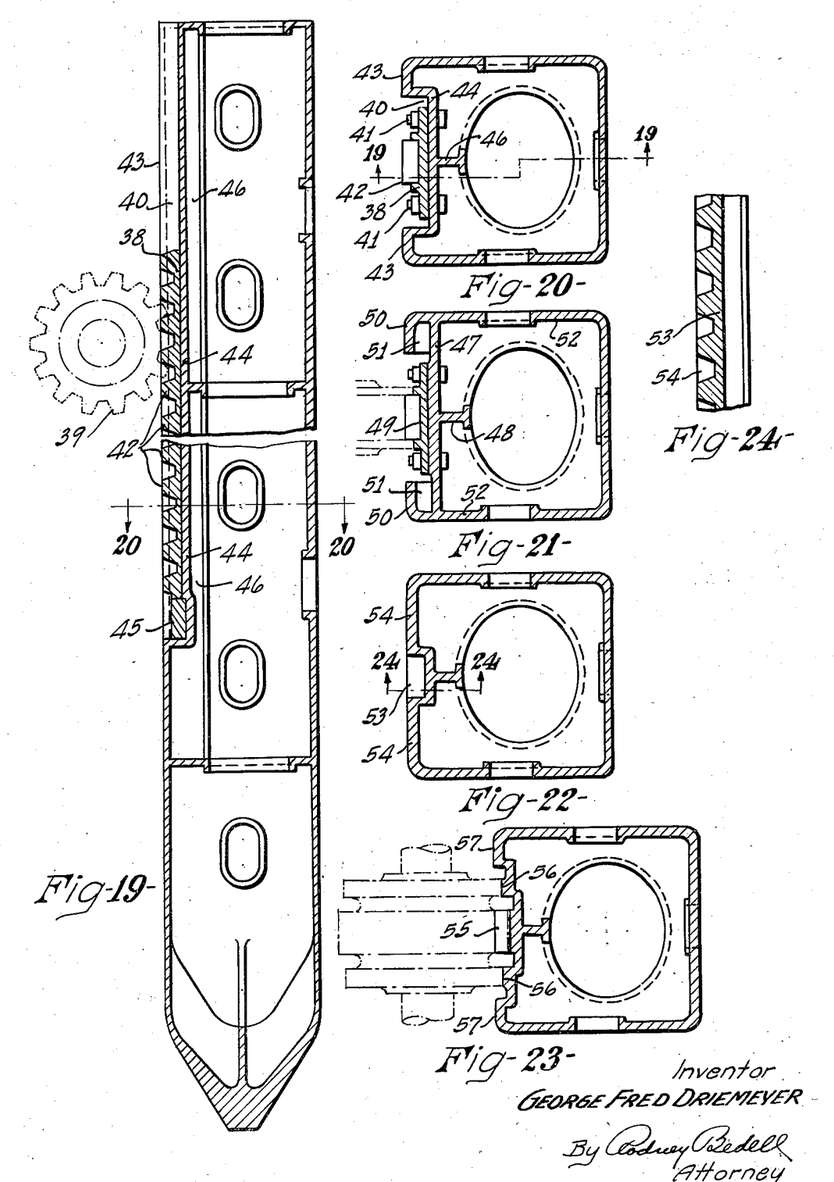
Figure 19 is a longitudinal section of a spud provided with a manipulating rack, the section being taken on line 19—19 of Figure 20.
Figure 20 is a transverse section taken on line 20—20 of Figure 19.
Figures 21, 22, and 23 are typical transverse sections illustrating other modifications.
Figure 24 is a section taken on line 24—24 of Figure 22 and showing the rack teeth.

Figures 19 and 20 illustrate a spud having the rack separately formed. The spud is raised and lowered by means of a rack 38 and pinion 39 operated by an engine on the hull. The rack 38 is secured in a recess 40 on one side of the spud by means of bolts 41. Teeth 42 of the rack do not project beyond the side portions or bearing guides 43 of the wall 44 and, therefore, it is not necessary to enlarge the bearings in the boat to clear the rack. Blocks 45 are inserted below and above the rack 38 to relieve bolts 41 of vertical loads. A rib 46 on the inside of wall 44 reinforces the latter adjacent to the rack.

Figure 21 illustrates a form somewhat similar to that shown in Figure 20, and includes a plane wall 47 extending from side to side and reinforced by rib 48 and upon which the rack 49 is mounted. Angular side members or guides 50, braced by ribs 51, extend flush with the outer edges of the rack teeth. In this construction, forces transferred from the rack to the wall 47 are carried directly to the side walls 52 instead of to the guides 43, as in Figure 20.

Figures 22 and 24 illustrate another modification in which the rack 53 is formed integral with a wall of the spud, the side portions 54 of which wall are flush with the extremities of the rack teeth and serve as bearing guides. This simplifies and decreases the weight of the structure.

Figure 23 illustrates another form of spud having the rack 55 formed integral and includes restricted pinion bearings 56 on each side of the rack and inside the bearing guides 57.

Figure 25:
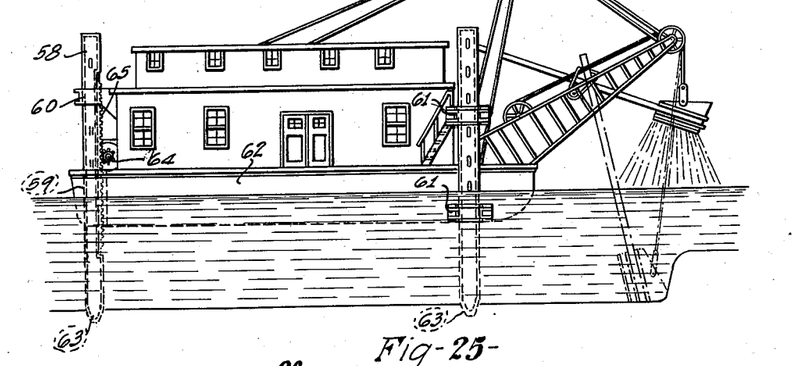
Figure 25 is a general view of a dredge illustrating the spuds in operation.

Figure 25 illustrates a dredge of the dipper type utilizing spuds 58 mounted in bearings 59, 60, and 61 on the hull 62 and body of the boat. The restricted ends 63 of the spuds are shown imbedded in the bottom being dredged. Each spud is raised and lowered by means of a pinion 64, preferably power operated, engaging rack 65.

Figure 26:
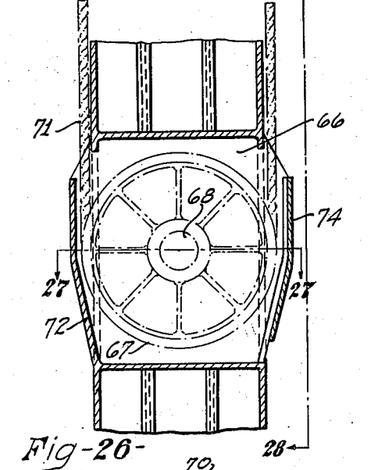
Figure 26 is a detail longitudinal section taken on line 26—26 of Figure 28 and illustrating the middle portion of another form of spud.
Figure 27:
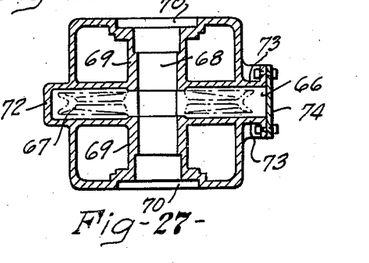
Figure 27 is a transverse section taken on the line 27—27 of Figure 26.
Figure 28:
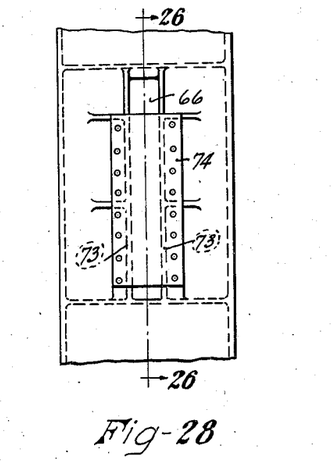
Figure 28 is a side view of the form shown in Figure 26.
Figure 29:
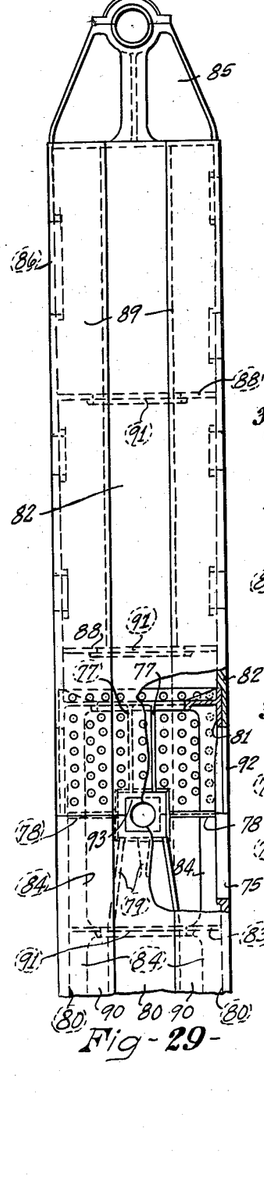
Figures 29 and 30 are side views at 90 degrees to each other illustrating the upper portion of still another form of the spud, portions being broken away for clearer disclosure.

In Figures 26, 27, and 28 is shown a portion near the middle of a spud having a narrow recess 66 receiving a sheave wheel 67. The axle 68 is seated in bearings 69 at the sides of recess 66 and the shaft and wheel are maintained in position by means of plates (not shown) seated in recesses 70 in the spud walls at the ends of the axle. Wheel 67 is utilized in raising the spud by means of a cable 71 passing around the wheel and operated from a hull as in the case of the rope 35 in Figure 13. If desired, the spud may be provided with a pair of sheave wheels, one below and one above the hull, and these may be utilized in both raising and lowering the spud.

Extending over the recess 66 on one side is an apron 72 formed integral with the adjacent wall and open at the top for the cable 71. At the opposite side are a pair of ribs 73 on each side of the recess to which is secured a plate 74. Apron 72 and plate 74 protect the rope and sheave wheel bearing from gritty or sharp objects which may be washed towards the spud, especially during digging.

In Figures 29 to 32, the spud is formed of two integral sections. The lower or main section at its upper end is slotted, as at 75, the portions at the sides of the slot including bearings 76 for the upper sheave wheel. These bearings are braced by ribs 77, 78, and 79. The side walls 80 of the lower casting are continued a short distance above the bearings 76, as at 81, and form bolting surfaces for attachment to the lower end of the walls 82 of the extension casting. Immediately below the bearings 76 is a transverse bracing web 83, and longitudinal ribs 84 merge therewith. The extension member has bifurcations 85 at the upper end arranged for mounting the upper sheave wheel and has an upper manhole opening 86 and is braced by transverse webs 88. The walls 82 at their lower ends form bolting surfaces for attachment to the corresponding surfaces on the upper end of the main portion of the spud, previously described. The side walls of both the extension and main portions of the spud are provided with spaced longitudinal bearings forming runways 89 and 90. The opening 86 and the substantial apertures 91 in transverse webs 83 and 88 are for admitting a workman into the interior of the spud. Suitable lubrication conduits (not shown) may be extended along the interior of the spud to the sheave wheels and supported by the webs 88 in suitable brackets on the walls of the spud.

The main portion of the spud is adapted to be used without the extension and has sheave wheel bearings and a sheave wheel opening towards its lower extremity which are preferably constructed as in Figures 26, 27, and 28 with protecting aprons. Opposing walls of the extension casting at the lower end have slots 92 and 93 clearing the sheave wheel opening in the lower section and the bearings for the shaft, respectively, so that if desired the sheave wheel may be mounted at the joint instead of at the top when the sections are used together or only the lower section used. However, the slots 92 and 93 may be eliminated, in which case the attachment of the extension would necessitate the removal of the upper sheave wheel to the top bearings 85. The longitudinal recesses between the runways 89 and 90 may be utilized for lubricant conduits as in Figure 42, to be described hereafter.

In Figures 33 to 36, the main body of the spud has a cross section similar to that shown in Figure 21, including a plane side wall 94 to which the rack 95 is secured by means of bolts 96 extending through lugs 97 and the wall. At the sides of the rack teeth are guide ribs 98 the teeth, ribs, and lugs 97 being preferably formed integral. Guides 99 extending along the edge of wall 94 correspond to guides 50 in Figure 21. At each end of the rack receiving part of the wall 94 is a bracket 100 having an inclined surface 101 engaging a wedge 102 inserted between the bracket and the rack. The wedges have slots 103 receiving securing bolts 104.

Brackets 100 are braced by ribs 105, an outer one of which on each bracket is extended outwardly and mounts a retaining clip 106 for additionally securing the wedge in position. The upper edges of the bracing ribs merge with wall 94 adjacent transverse webs 107, the upper of which is immediately below the top web 108. Webs 107 and 108 have elliptical and rectangular central apertures, respectively. Other bracing webs 109 along the spud correspond to webs 107.

The spud at its lower extremity between the lower bracket 100 and the point 110 is bulged outwardly in the direction perpendicular to wall 94 to form a portion 111 similar in cross section to the over-all section of the main or body part of the spud including guides 99. This facilitates insertion of the spud into the hull bearings, alinement of the portion 111 in the bearings insuring the proper cooperation of these bearings with the guides 99 and the flanged guide ribs 112.

Figures 30, 31, 32:
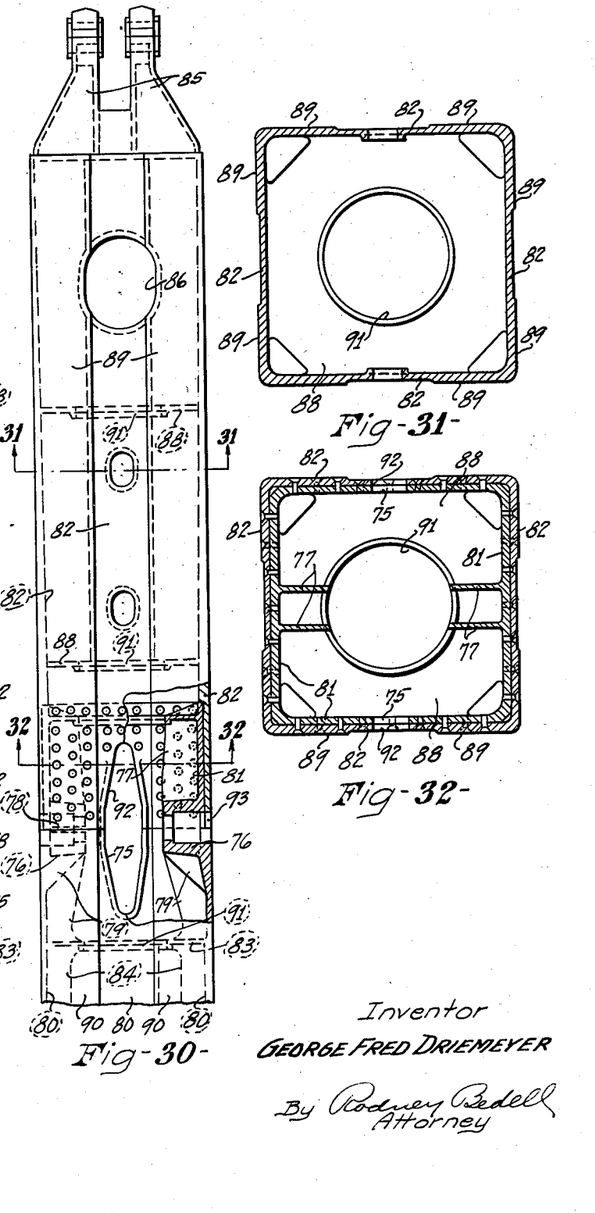
Figures 31 and 32 are transverse sections taken on the corresponding section lines of Figure 30.
Figures 33, 34, 35, 36:
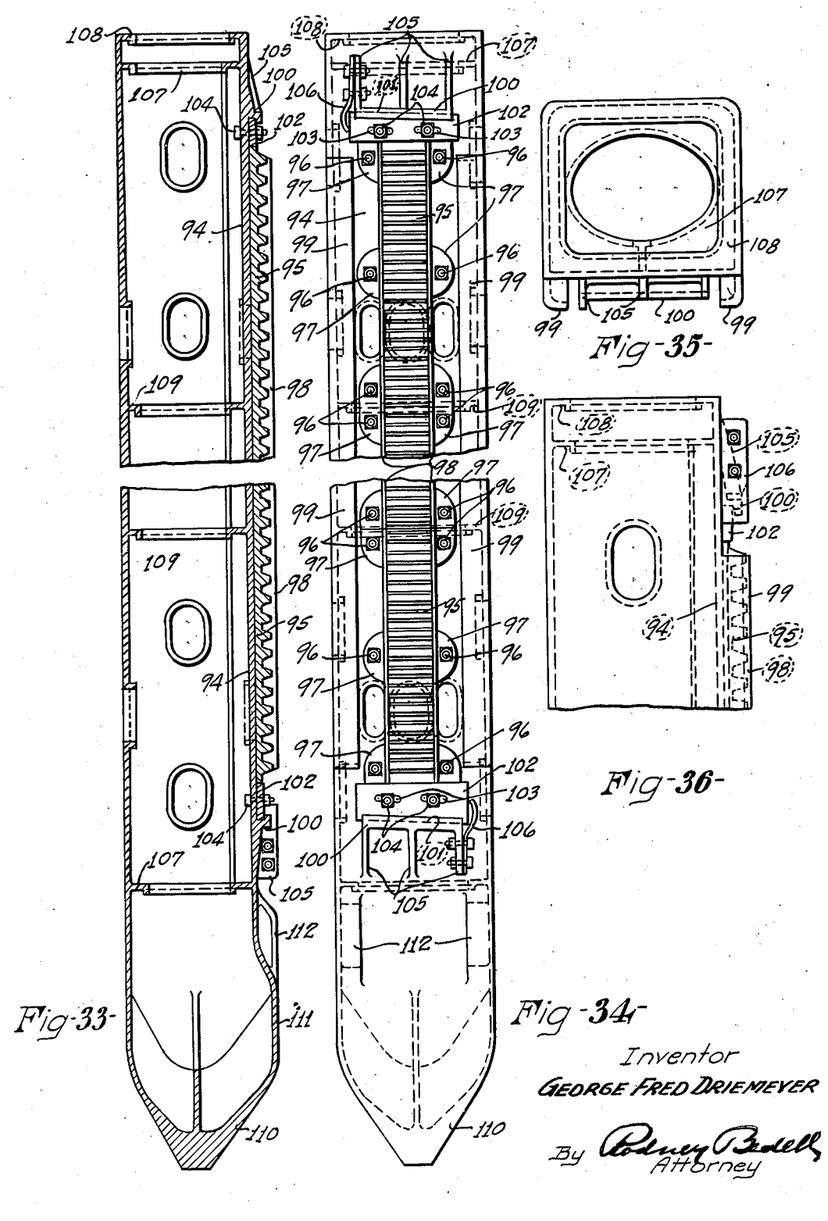
Figures 33 and 34 are a longitudinal section and a side view, respectively of another modification.
Figure 35 is a top view of the same, the retaining clip and rack being omitted.
Figure 36 is a detail side view of the same taken at 90 degrees to Figure 34.
Figure 37:
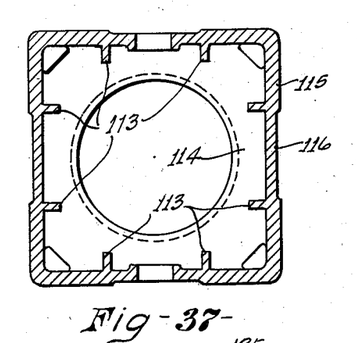
Figures 37 to 42, inclusive, are typical transverse sections illustrating various forms of spuds.
Figure 40:
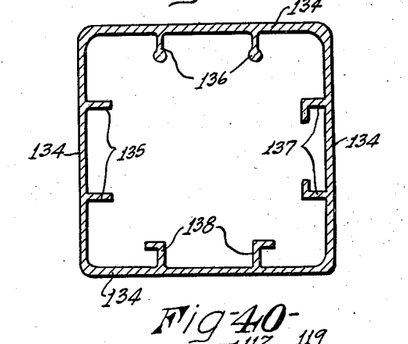
Figure 41:
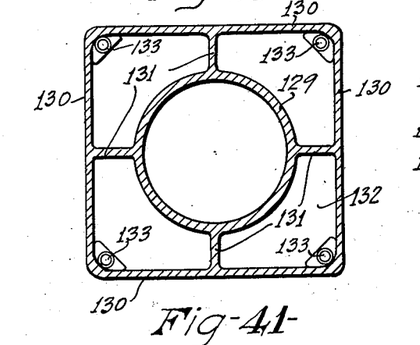
Figure 42:
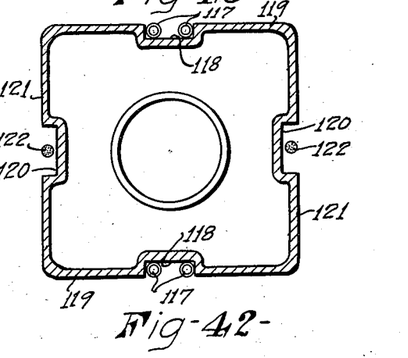

Figures 37 to 42, inclusive, are sections corresponding substantially with Figure 31 and illustrate various forms of spud castings. In Figure 37, the casting is of rectangular section and is provided with interior longitudinal and transverse bracing members 113 and 114. The outer surfaces of walls 116 are provided with restricted machined runway or bearing-forming surfaces 115 for cooperating with complementary bearings on the dredge hull. In Figure 42, lubricating conduits 117 are illustrated as extending along longitudinal depressions 118 in opposing walls 119, the depressions 120 in the walls 121 receiving the ropes or cables 122 for raising and lowering the spud.

Figure 38:
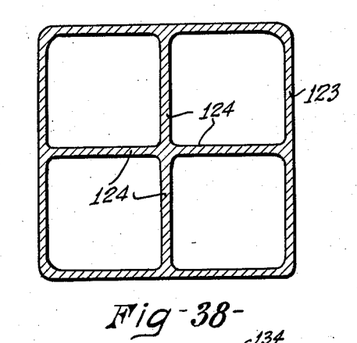
Figure 39:
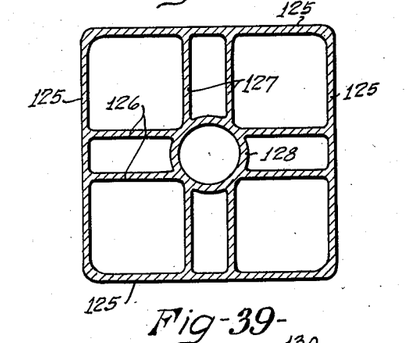

In Figure 38, the outer walls 123 of the casting are rectangularly disposed and are braced by ribs 124 intersecting at right angles. In Figure 39, the rectangular walls 125 of the structure are braced by pairs of parallel ribs 126 and 127, the ribs at the center merging with a longitudinal cylindrical member 128. In Figure 41, the central cylindrical member 129 is substantially larger than the member 128 in Figure 39 and is connected with the rectangular walls 130 of the casting by means of single ribs 131. The transverse webs 132 are aperturred at the corners for oil conduits 133. In Figure 40, the walls 134 on the sides of the rectangular casting are braced by pairs of ribs 135, 136, 137, 138, each pair being of slightly different shaping. Ribs of any of the shapes shown, or any combination thereof, may be used on all four sides.

In each case, suitable cores openings will be provided to facilitate cleaning and inspection of the casting and the various ribs and reinforcing elements may be multiplied, thickened, or otherwise varied according to specific requirements. Preferably the outer walls will be gradually increased in thickness from the ends of the spud toward the center, as in Figures 1 and 19.

Figures 43, 44, 45, 47, 48:
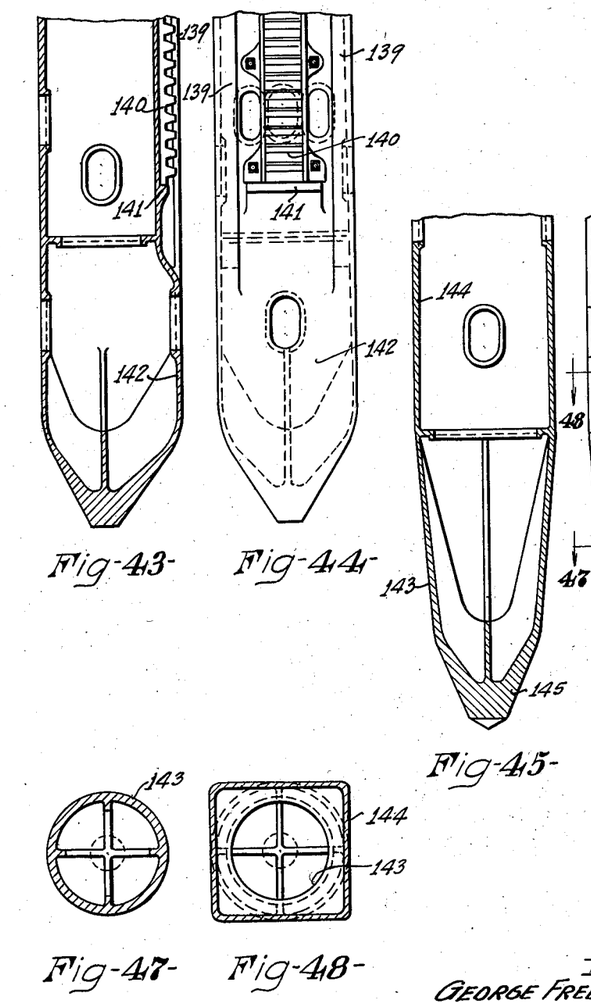
Figure 43 is a longitudinal section showing the lower portion of a spud similar in some respects to that in Figures 33 to 36.
Figure 44 is a side view of the same taken at right angles to Figure 43.
Figures 45 and 46 are a longitudinal section and a side view, respectively, of another modification.
Figures 47 and 48 are horizontal sections taken on the corresponding section lines of Figure 46.
Figure 46:
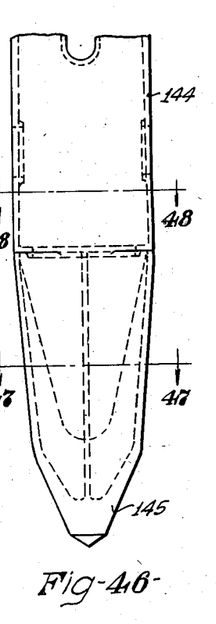

The form in Figures 43 and 44 is similar to that in Figures 33 to 36 except that the guides 139 at the sides of rack 140 extend downwardly past the rack abutment 141 and merge with the outwardly bulged side wall 142 of the spud tip. This arrangement further facilitates the insertion of the spud into its guides on the boat hull. The rack is shown as directly engaging the abutment bracket 141 but a wedge similar to the wedges 102 in Figures 33 to 36 will preferably be used at the top, only one wedge being necessary to firmly secure the rack in position.

In Figures 45 to 48 is shown a spud particularly adapted for use at the rear end of a drill boat, dredge, or similar vessel where it is desirable to swing the front end of the boat around a single spud at the rear end. This is effected by "walking spuds" having broad shoes to prevent the spuds becoming imbedded in the water bed. To facilitate rotation of the spud when the tip is buried in the water bed, a gradually tapering conical tip 143 is provided at the lower extremity of the rectangular body portion 144 of the spud. The extreme lower end 145 of the tip is pointed to permit the tip to penetrate hard bottom material such as gravel and rock. Where the tip and body of the spud are rigid, the integral formation of the parts is particularly advantageous in resisting torsional strains.

In each of the forms, metal may be most advantageously disposed in the various walls, and in the reinforcing ribs and diaphragms or transverse webs in order to provide reinforcement commensurate with the compressive, bending and torsional forces to be resisted. It is especially desirable to gradually increase the thickness of the side walls from the ends to the intermediate portion, as most clearly illustrated in Figures 1 and 2 and 19 in order to resist bending forces. Figures 29, 30, 33, 34, 43 and 44 also embody this feature. This is an improvement over previous structures which include shorter plates riveted or welded to the main plates to increase the metal thickness at points of greatest stress. At the ends of the shorter plates, sharp changes in stress are produced which tend to concentrate deflection at these points. With the gradually increasing metal thickness, deflection is gradually distributed throughout the walls of the spuds and no excess metal is required to withstand the forces applied at various points along the spud. In Figures 9 and 10, and 45 and 46, means is provided for substantially decreasing or eliminating the torsional forces produced in certain types of spuds when the vessel is swinging around.

Various details of the illustrated structures are not essential and these may be varied as will occur to those skilled in the art to which the invention pertains, and the exclusive use of all such modifications as come within the scope of the appended claims is contemplated.

What is claimed is:

1. An integral box-section spud of the class described having rack elements on one side, guides on said side with portions in alinement with the walls merging with said side, and a reinforcing element extending along said side in alinement with said rack elements.

2. The combination of a spud of the class described comprising an integral cast metal unit including spaced longitudinally extending guides for engaging the bearings in the supporting hull, transverse reinforcing ribs between said guides and the wall of the spud, and a rack for said spud located between said guides.

3. In a spud of the class described, an elongated body portion, rack structure on one side wall thereof, and guides at the sides of said structure for engaging boat hull bearings, said guides terminating short of the end of the spud and the portion of said spud beyond said guides being bulged outwardly and having parts approximately flush with all of said guides.

4. In a spud of the class described, a body member having a hollow portion adjacent one end thereof and longitudinal guides projecting from said body, said hollow portion being bulged outwardly and flush with said guides, and a guide rib between said body member and said bulged portion.

5. Structure as specified in claim 4 in which said guides, bulged portion, and rib are flush and adapted to engage boat hull guides to facilitate insertion of the spud therein.

G. FRED DRIEMEYER.